(12) United States Patent
Brookes et al.

(10) Patent No.: US 6,186,655 B1
(45) Date of Patent: Feb. 13, 2001

(54) AUGER FED EXTRUDER

(75) Inventors: Sean R. Brookes, North Canton; Kilian Mendel, Wadsworth; Robert L. Sadinski, Tallmadge, all of OH (US)

(73) Assignee: Owens Corning Fiberglass Technology, Inc., Summit, IL (US)

( * ) Notice: Under 35 U.S.C. 154(b), the term of this patent shall be extended for 0 days.

(21) Appl. No.: 09/226,484

(22) Filed: Jan. 7, 1999

(51) Int. Cl.$^7$ ................................ B29B 7/42; B29B 7/60
(52) U.S. Cl. .......................................... 366/76.4; 366/76.6
(58) Field of Search .................................. 366/76.1, 76.3, 366/76.4, 76.6, 76.9, 76.91, 76.93, 77, 79, 80, 83, 91, 100, 133, 134, 156.1, 156.2, 158.4, 186; 222/413

(56) References Cited

U.S. PATENT DOCUMENTS

| 731,073 | * | 6/1903 | Rust . | |
|---|---|---|---|---|
| 1,977,515 | * | 10/1934 | Klippel . | |
| 3,645,505 | * | 2/1972 | McLeod, Jr. et al. . | |
| 3,746,319 | * | 7/1973 | Blach . | |
| 3,865,355 | * | 2/1975 | Eauclaire . | |
| 3,868,093 | * | 2/1975 | Sokolow | 366/76.6 |
| 3,892,390 | * | 7/1975 | Eauclaire . | |
| 3,907,259 | * | 9/1975 | Leclercq . | |
| 4,039,169 | * | 8/1977 | Bartholomew . | |
| 4,268,176 | * | 5/1981 | Muller . | |
| 4,289,409 | * | 9/1981 | Brand . | |
| 4,443,109 | * | 4/1984 | Watts | 366/76.6 |
| 4,473,299 | * | 9/1984 | Guibert . | |
| 4,987,850 | * | 1/1991 | McCracken . | |
| 5,297,865 | * | 3/1994 | Engel et al. | 366/76.3 |
| 5,338,112 | * | 8/1994 | Boden et al. | 366/76.4 |
| 5,749,649 | * | 5/1998 | Schobert-Csongor et al. | 366/76.4 |

FOREIGN PATENT DOCUMENTS

| 31 19 569 | 12/1982 | (DE) . |
|---|---|---|
| 0 806 280 | 11/1997 | (EP) . |
| 2 116 865 | 10/1983 | (GB) . |

* cited by examiner

Primary Examiner—Tony G. Soohoo
(74) Attorney, Agent, or Firm—Inger H. Eckert; Anthony R. Chi

(57) ABSTRACT

An extruder such as a reclaim extruder includes a feed section with a throat into which a force feeder is positioned to compact and feed reclaim material at a higher and more productive rate. The force feeder includes three side-by-side augers pointed at the extruder screw axis. An AC variable frequency drive motor drives a double sided cog belt in serpentine fashion around respective pulleys or sheaves for the augers. Two of the augers are of one hand rotated in one direction, and one of opposite hand rotated in the opposite direction. The pulleys or sheaves are of different size so that each auger rotates progressively faster moving down stream of the extruder screw. Each auger is positioned in a closely fitting compression tube each provided with an inlet opening. The force feeder is conveniently angularly positioned through the wall of a collection box between a hopper and the throat of the extruder.

20 Claims, 3 Drawing Sheets

AUGER FED EXTRUDER

DISCLOSURE

This invention relates generally as indicated to an over fed extruder, and more particularly to a reclaim extruder and the feeding of such extruder which greatly increases the rate or through-put of the extruder.

BACKGROUND OF THE INVENTION

In the manufacture of extruded foam products such as styrene sheet, board or billets, the extruded products are subjected to cutting and trimming, and defect or off grade rejections, particularly on start-up of the continuous extrusion line. The operations produce a substantial amount of scrap, which can range from large pieces to sawdust. The scrap is economically recycled.

Large pieces of scrap are run through a scrap chopper, collected in a storage silo, and then the smaller particulate material is run through a reclaim extruder. The material is remelted and the melt extrudate is chopped and cooled to form feed pellets which are then added to the virgin raw material supply of the continuous extrusion line.

The chopped reclaim material from the scrap chopper or silo has the consistency and low density of fluff. The material is so light that it is often conveyed from the silo to the reclaim extruder with forced air conveyors or grain conveying augers.

The reclaim extrusion rate or output is a direct function of the mass of the material entering the feed throat of the reclaim extruder. Thus the lighter the density of the material, the lower the through-put or extrusion rate. The through-put or rate is normally measured in pounds per hour.

Many attempts have been made to improve the through-put of reclaim extruders. These usually involve the use of a force-feed section in the throat of the reclaim extruder. These force-feed sections generally take the form of one or more augers, supposedly designed to push or compress the light fluffy material into the feed section of the reclaim extruder. One prior attempt involved three rotating augers driven by a DC motor and drive chains. The three auger device was extremely complex and a nightmare to maintain. The rate, when operating properly, only increased about 50 to 200 pounds per hour for a total rate of about 500–700 pounds per hour, depending on the density of the fluff material entering the extruder. One of the problems was overpacking the feed throat, and this would lead to "rat holing," where the auger simply forms a hole in the over-packed material. This would then cause loss of feed to the reclaim extruder. It has been characterized as pushing marshmallows with a bulldozer, since the system had no feel or ability to react to the light density material.

On the other hand, when heavier density material was introduced, the system could quickly become overloaded and stall, also shutting down the system completely. Accordingly, with rat holing, frequent stalling, complexity in structure, difficulty in maintenance, and, more importantly, minimal or no improvement in through-put, the three auger system was abandoned as unworkable.

Accordingly, it would be desirable to have a system which would be more rugged in design, easier to maintain and operate on a continuous and reliable basis, but, more importantly, one which would substantially increase the output rate of the reclaim extruder.

SUMMARY OF THE INVENTION

A reclaim extruder is provided with an improved force feed section which has three rotating augers, two of one hand and one of opposite hand, which are each driven at different speeds and torques. Each auger has an individual compression tube which closely surrounds the auger. The augers are driven by a common belt drive and a proportional speed train for control of compaction into the feed throat of the reclaim extruder. A drive package provides continuous torque and can be stalled under load without overdriving the material beyond the load ability of the extruder.

The force feeder of the reclaim extruder comprises two right (one) hand and one left (opposite) hand force feed auger screws. The augers are pointed at and intersect the axis of the extruder screw, and the ends of the augers are positioned close to the flights of the extruder screw. The augers are driven by a common timing belt that serpentines around the respective drive pulleys of the augers. The serpentine arrangement causes two of the augers to turn in a common direction, while the other turns in the opposite direction. However, because of the right hand and left hand augers, the reclaim fluff material is advanced forward for all three augers. The screws are driven by an AC variable frequency drive, and a simple right angle gear box. The AC drive is set such that a torque setting limits the compaction rate and has the ability to stall the force feeder system under full load. The force feeder augers can also restart as material is taken from the reclaim extruder feed throat, which is important in assuring that the feed throat does not become over-packed.

A feature of the invention is the respective compression tubes for each auger which allows material to enter the force feed augers and also provides a resistance while the material is being advanced. These tubes surround each feed auger and have feed openings that allow the material to enter the flights of the augers. The resistance and restraint of the tubes causes the density to increase for a given volume. Another feature is that the force feeder augers have a mechanical proportional speed train that helps control the compaction into the reclaim extruder. The auger with the largest pulley turns at a proportional slower rotational speed as compared to the force feed auger with the smallest pulley. The auger turning at the slowest speed adds material at the beginning or upstream section of the reclaim extruder screw; the second turning at an intermediate speed adds more; and then the third turning at the fastest speed adds the final material at the down stream end of the throat prior to entering the reclaim extruder barrel. The material density just prior to the barrel entry is important since it is the actual feed rate of the reclaim extruder itself. The proportional train also assists in the proper compaction for various densities that enter the reclaim extruder as noted above. For lighter densities, the force feeder avoids the problems of overpacking and "rat holing" the material thus causing a loss of feed to the extruder. On the other hand, when heavier density material is introduced, if the system becomes overloaded with too much material, it will stall and automatically restart when the overloading portion moves into the extruder barrel. This helps control the compaction across the linear face of the reclaim extruder screw.

The system also has a diverter plate which maintains the compaction deep into the feed throat. This plate prevents material from escaping the feed throat and also provides a directional feed for the fluff material as it enters the force feeder augers from the upper side.

The force feeder is mounted at an angle through the wall of a collection box which houses the force feeder assembly and is placed to project into the feed throat of the extruder. The direction of the reclaim screw extruder with respect to the force feeder position is important in that the force feeder is placed to cause the fluff material to be pinched against the feed throat as it enters the machine and reclaim screw turns.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
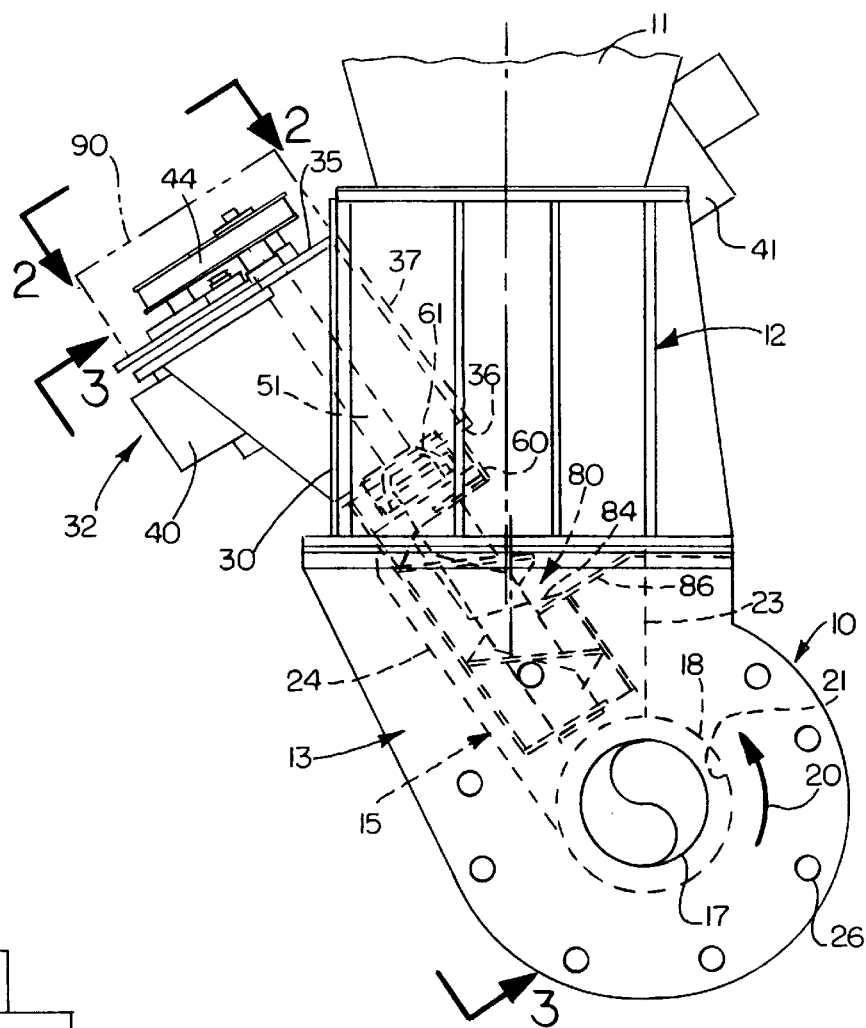
FIG. 1 is a broken rear elevation view of the reclaim extruder looking downstream of the extruder screw and showing the throat of the extruder with the force feeder angularly positioned into the throat through a collection box wall.
Figure 2:
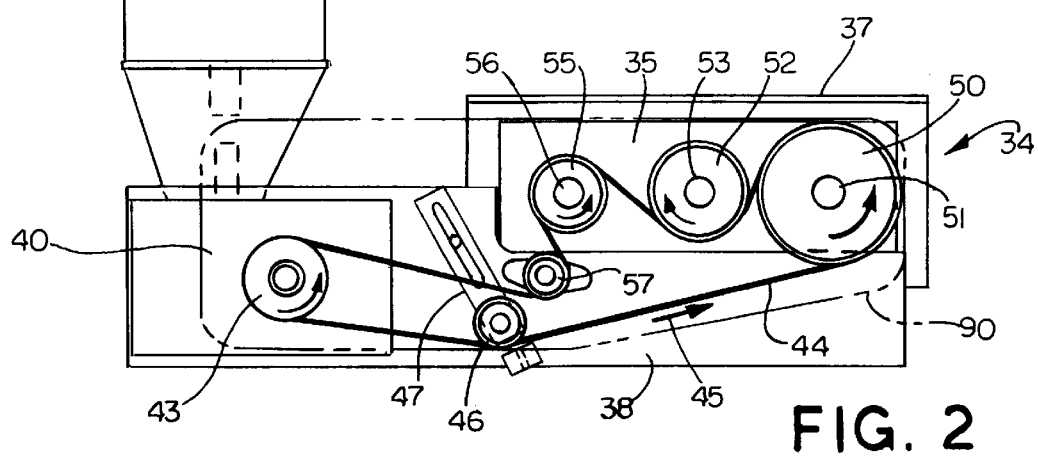
FIG. 2 is an end elevation of the force feeder seen from about the line 2—2 of FIG. 1 showing the drive.
Figure 3:
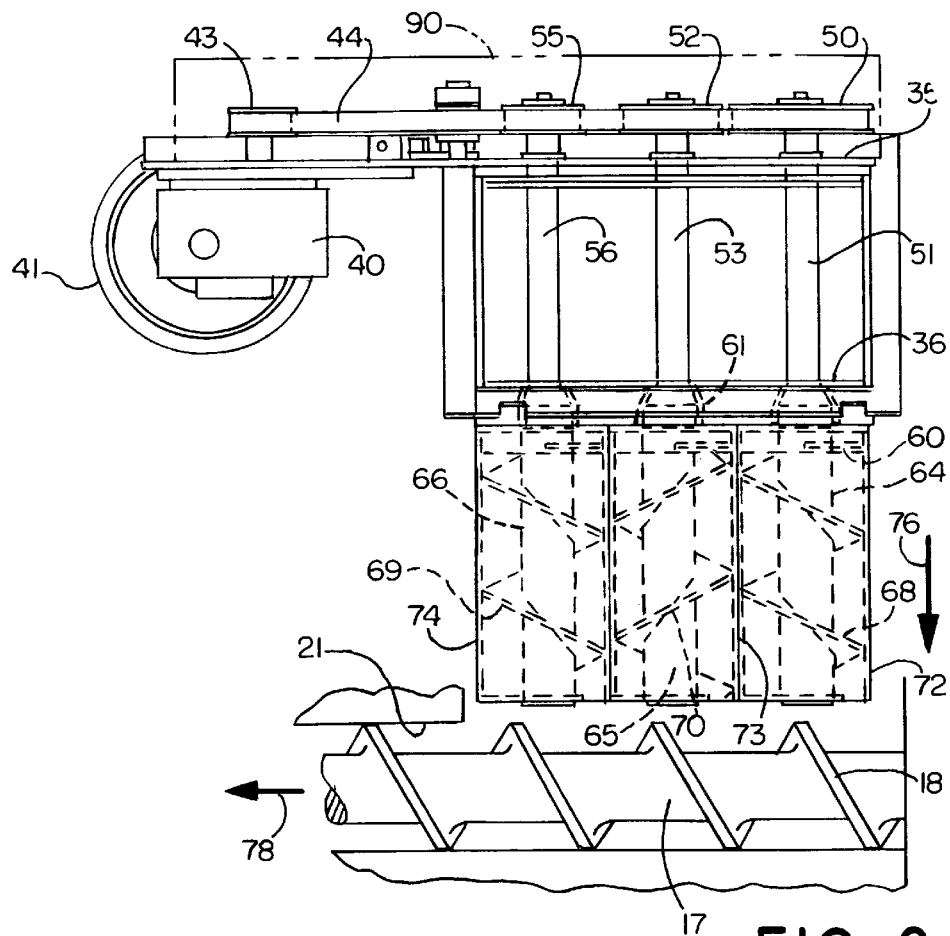
FIG. 3 is a side elevation of the force feeder taken from about the line 3—3 of FIG. 1 showing the three augers and their relationship to the reclaim extruder screw.

Referring initially to FIGS. 1–3, there is illustrated a reclaim extruder shown generally at 10 which includes a feed hopper 11 mounted on a collection box 12 which sits on the feed section 13 of the extruder 10 above the throat shown generally at 15. The extruder includes a screw 17 having flights 18 rotating in the direction of the arrow 20. The screw rotates closely within a barrel 21 seen more clearly in FIG. 3. In FIG. 1, the view is looking downstream of the extruder.

The feed throat section of the extruder includes a vertical wall shown at 23 and an inclined wall shown at 24. These two side walls, which open at the bottom to the extruder screw and at the top to the bottom of the box, form what is known as the feed throat of the extruder. The feed throat section forms the upstream end of the extruder and is mounted on the upstream end of the barrel by suitable large fasteners indicated at 26. The material entering the feed throat section of the extruder is advanced by the screw into the barrel where heat is applied to cause the material to melt forming an extrudate melt which is then extruded through a pelletizing die. The material exiting the pelletizing die is then cut into small pellets and cooled. The cooled material in pelletized form is then added to the virgin material to be recycled through the continuous extrusion line.

As indicated, the scrap is normally collected in a silo and then may be conveyed to the top of a hopper 11 by a forced air conveyor or grain auger, and the conveyor will normally keep the hopper and collection box full to keep material over the feed throat section of the extruder.

Mounted in inclined fashion through the wall 30 of the collection box 12 is a force feeder shown generally at 32. The force feeder 32 is itself mounted on a frame or housing indicated generally at 34 which includes an 10 outer plate 35, a somewhat smaller inner plate 36, and a connecting plate 37 which extends through the wall of the collection box at the angle seen in FIG. 1.

As seen more clearly in FIG. 2, the frame includes a motor mounting plate 38 which projects forwardly of the force feeder. On the projecting end of the plate there is provided a gear reducer 40 and a variable frequency AC motor 41 projecting at right angles. As seen in FIG. 1, the design permits the motor 41 to extend just forwardly of the collection box and hopper so that the frame and motor in effect wrapped around two sides of the hopper and box as illustrated.

The gear reducer 40 drives a timing pulley 43 seen more clearly in FIGS. 2 and 3. The timing pulley 43 drives a double sided cog timing belt 44. The belt moves in the direction of the arrow 45 seen in FIG. 2 and, from the pulley 43, first moves around an adjustable timing pulley 46. The pulley 46 may be adjusted on bracket 47 for belt tensioning purposes. From the adjustable timing pulley 46, the belt moves around relatively large timing pulley 50 mounted on shaft 51. The belt then moves in serpentine fashion around the somewhat smaller timing pulley 52 mounted on shaft 53. The belt then moves around even smaller timing pulley 55 mounted on shaft 56. The timing pulley then moves around fixed timing pulley 57 and finally back to the main drive pulley 43. It can be seen that the double sided cog timing belt utilizes the cogs on the interior of the belt to rotate the timing pulleys 50 and 55, but on the exterior of the belt to rotate the timing pulley 52. It can also be seen that the two timing pulleys 50 and 55 rotate in one direction, while the timing pulley 52 rotates in the opposite direction.

As seen more clearly in FIG. 3, the shafts 51, 53, and 56 extend between the frame plates 35 and 36. Beyond the plate 36, the frame is provided with journal boxes indicated at 60 for tapered roller bearing journals 61. Extending from such journals are augers 64, 65, and 66, with the augers 64 and 66 having right hand auger flights as seen as 68 and 69, respectively, while the center auger 65 has a left hand flight seen at 70. The shafts and augers may be formed integrally. Each auger is closely surrounded by a respective compression tube as indicated at 72, 73, and 74, respectively. Accordingly, even though the center auger is rotated in the opposite direction, the rotation of each auger will force material from the collection box in the direction of the arrow 76 seen in FIG. 3 against the flights 18 of the extruder screw which is moving the material in the direction of the arrow 78 through the barrel 21. The augers are side-by-side, parallel to each other, and the axis of each auger is aimed at the axis of the extruder screw 17.

Figure 4:
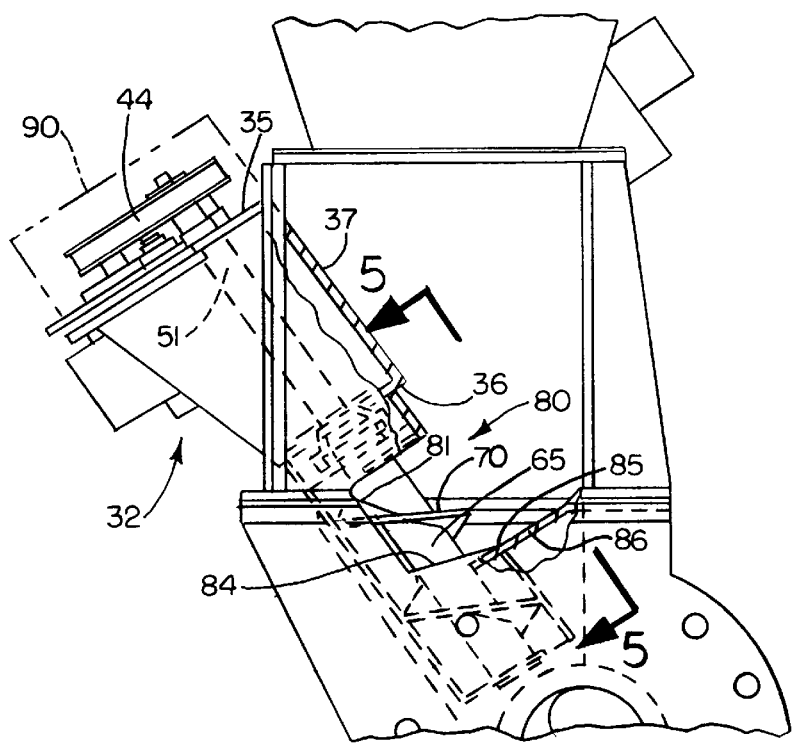
FIG. 4 is a view like FIG. 1 but showing the collection box partially broken away and showing the side profile of the feed opening in a compression tube.
Figure 5:
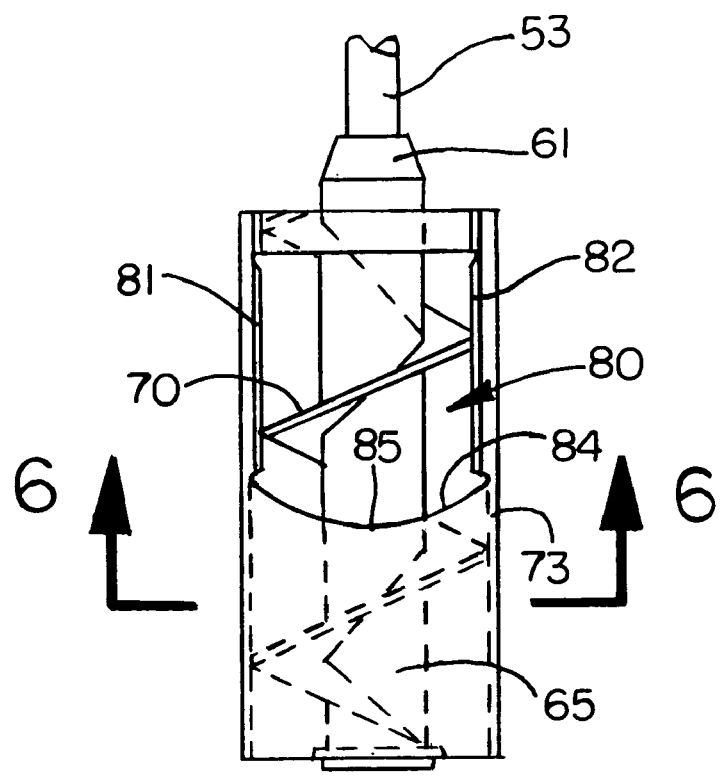
FIG. 5 is a broken elevation of an auger and showing the top of the feed hole in the surrounding compression tube as seen from approximately the line 5—5 of FIG. 4.
Figure 6:
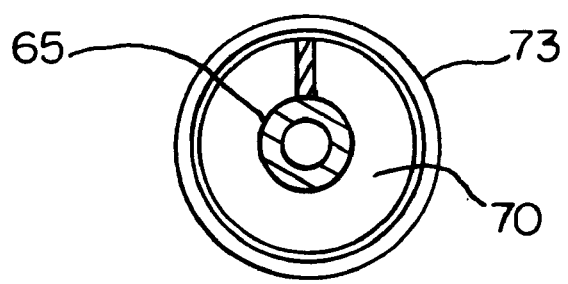
FIG. 6 is a transverse section of the auger and compression tube as seen from the line 6—6 of FIG. 5.

As seen more clearly in FIGS. 1, 4, and 5, each compression tube is provided with an inlet opening shown generally at 80. Each lateral edge of the opening shown generally at 81 and 82 extends parallel to the axis of the auger, and such lateral edges are somewhat more than 180° apart. The lower edge of the opening extends on a slight symmetric reverse curve as indicated at 84 in FIG. 5. The zenith of the curve indicated at 85 is flush with an inclined deflector plate 86 which is clamped between the collection box and the feed throat section of the extruder. The inclined deflection plate deflects any material dropping through the collection box into the respective openings of the compression tubes, and keep compressed material from reentering the collection box.

As indicated at 90, the moving timing belt and timing pulleys may be enclosed during operation by a transparent cover readily fastened or hinged to the top of the force feed unit. With the construction shown, the force feed unit can be inserted in and removed form the wall of the collection box in an expeditious manner in a short period of time.

With reference to FIG. 2, as an example, the main drive pulley 43 may have 24 teeth, while the large pulley 50 may have 40 teeth. The intermediate pulley 52 may have 28 teeth, and the smaller pulley 55 may have 22 teeth. It should be kept in mind that in viewing FIG. 2, the material moving with the extruder screw is moving from right to left, and that the pulley 55 is the downstream pulley, while the pulley 50 is the upstream pulley. It can be seen that the auger being driven by the pulley 55 rotates faster than the auger 52, which rotates even faster than the auger 50. However, the moment arm or torque on each auger is higher at the upstream end and lower at the downstream end.

Tests of the present invention indicate that a consistent and reliable through-put of approximately 1100 to 1300 pounds per hour can be obtained, and it is believed that even higher through-puts such as 1900 pounds per hour are obtainable. This is approximately double the production rate or through-puts described above.

The invention, of course, also includes the method of feeding an extruder, which comprises the steps of feeding fluff or reclaim material into the throat of the extruder and forcing the such material into the throat of the extruder at progressively increasing rates downstream of the extruder screw. The material is forced into the throat of the extruder by side-by-side rotating augers, with the auger furthest downstream rotating the fastest. Each auger is surrounded by the compression tube which provides resistance and restraint causing the density to increase for a given volume. The variable frequency AC drive motor will automatically stall under load, but as soon as that load is relieved, such as by further turning of the extruder screw, the drive will restart itself automatically without damage to the system. The transmission driven by the variable frequency AC drive motor, together with the double sided belt and multiple size pulleys, provides a mechanical proportional speed train that helps control the compaction into the reclaim extruder throat. With the invention the production rate or through-put of the extruder has been found to be approximately twice or more the production rate of previous reclaim extruders, depending on the material density entering the feed throat.

To the accomplishment of the foregoing and related ends, the invention then comprises the features particularly pointed out in the claims, these being indicative, however, of but a few of the various ways in which the principles of the invention may be employed.

What is claimed is:

1. An extruder comprising a feed hopper, an extruder screw and a barrel, and a feed throat section between the hopper and barrel, a plurality of rotating augers adapted to force material into the feed throat section, said augers each having an axis of rotation intersecting the axis of the extruder screw, and a drive means in connection to each of said augers to rotate each said augers at progressively increasing speeds in a respective downstream direction of the extruder.

2. An extruder as set forth in claim 1 wherein the axes of said augers are parallel to each other.

3. An extruder as set forth in claim 1 wherein said drive means is a variable frequency AC drive which will stall under load and restart when the load is reduced.

4. An extruder as set forth in claim 1 wherein said augers are three in number, two of which are of one hand, and the other the opposite hand.

5. An extruder as set forth in claim 4 wherein said drive means is provided with means to rotate said two in one direction and the other in the opposite direction.

6. An extruder as set forth in claim 5 wherein said drive means comprises a cog belt, sheaves for each auger, and cogs on both sides of said belt for engaging alternate sheaves.

7. An extruder as set forth in claim 6 wherein said sheaves are each of a different size.

8. An extruder as set forth in claim 7 wherein said sheaves reduce in size in a downstream direction of the extruder.

9. An extruder as set forth in claim 7 wherein said sheaves are sized to rotate more rapidly in a downstream direction of the extruder.

10. An extruder as set forth in claim 1 wherein each auger is surrounded by a compression tube.

11. An extruder as set forth in claim 1 including a deflector plate operative to direct material to the augers and contain compressed material.

12. An extruder comprising a feed hopper and an extruder screw and barrel, a feed throat section between the hopper and barrel, said feed throat section including a plurality of side-by side rotating augers directed generally at the extruder screw, and respective compression tubes surrounding each auger, and including drive means for rotating each of said augers at a different speed.

13. An extruder as set forth in claim 12 wherein said drive means is a variable frequency AC drive which will stall under load and restart when the load is reduced.

14. An extruder as set forth in claim 13 wherein said augers are three in number, two of which are of one hand, and the other the opposite hand.

15. An extruder as set forth in claim 14 wherein said drive means is provided with means to rotate said two in one direction and the other in the opposite direction.

16. An extruder as set forth in claim 15 wherein said drive means comprises a cog belt, sheaves for each auger, and cogs on both sides of said belt for engaging alternate sheaves.

17. An extruder as set forth in claim 16 wherein said sheaves are each of a different size.

18. An extruder as set forth in claim 17 wherein said sheaves reduce in size in a downstream direction of the extruder.

19. An extruder as set forth in claim 17 wherein said sheaves are sized to rotate more rapidly in a downstream direction of the extruder.

20. An extruder as set forth in claim 12 including a deflector plate directing material into said compression tubes and containing material compressed thereby.

* * * * *